Figures 1, 2:
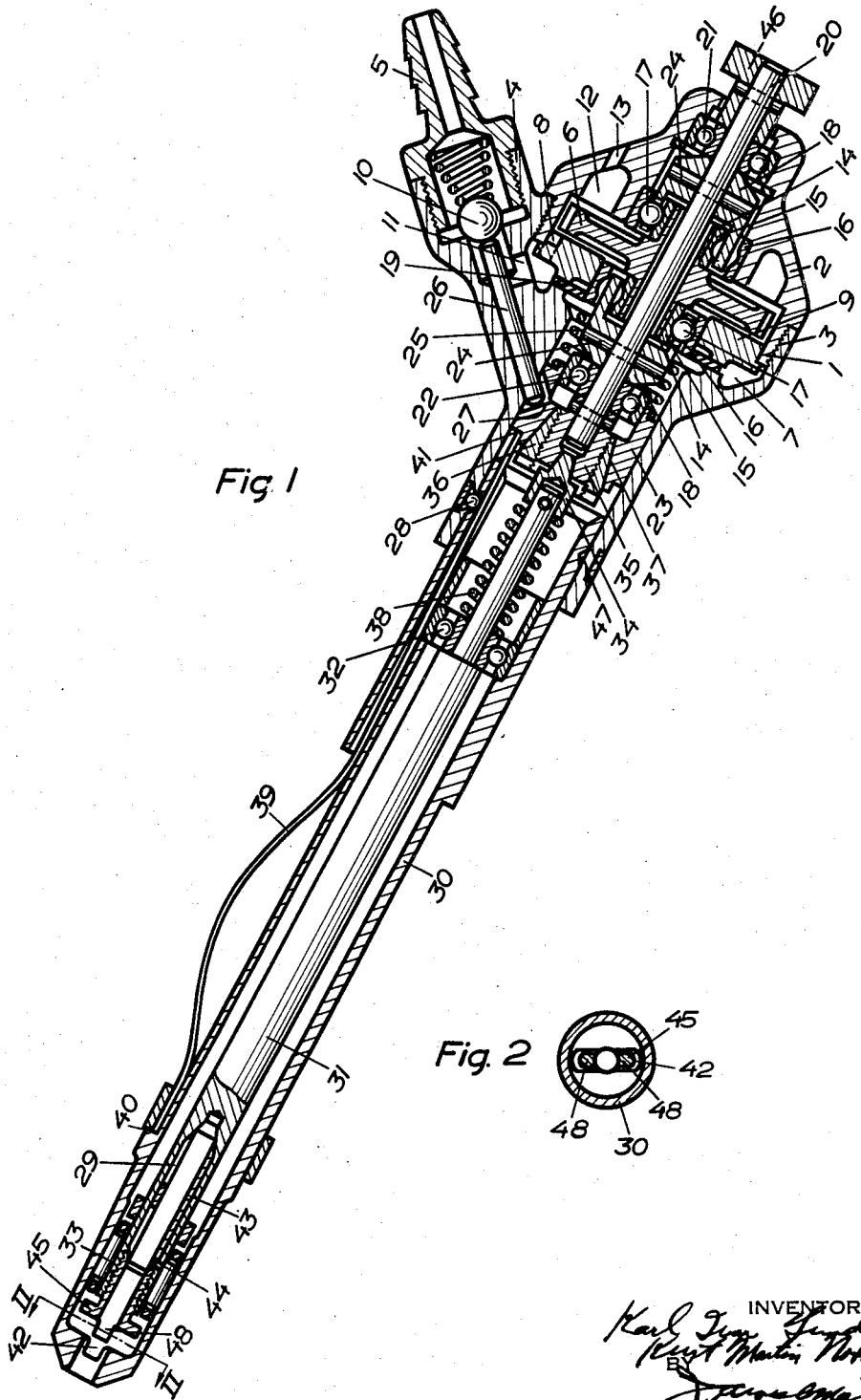

Oct. 14, 1958    K. I. LUNDGREN ET AL    2,855,671
TOOLS HAVING A PRESSURE FLUID DRIVEN ROTARY MOTOR
Filed Feb. 20, 1956

INVENTORS
ATTORNEY

United States Patent Office 2,855,671
Patented Oct. 14, 1958

2,855,671

TOOLS HAVING A PRESSURE FLUID DRIVEN ROTARY MOTOR

Karl Ivar Lundgren, Hagersten, and Kurt Martin Nordfors, Nacka, Sweden, assignors to Atlas Copco Aktiebolag, Nacka, Sweden, a corporation of Sweden Application February 20, 1956, Serial No. 566,654

Claims priority, application Sweden March 3, 1955

10 Claims. (Cl. 32—26)

This invention relates to tools having pressure fluid driven rotary motors, such as grinding machines, drilling machines or the like, and particularly dental machines. One object of the invention is to provide a portable or hand tool which has low weight and small dimensions and is easy to operate and which is particularly adapted for replacing conventional belt driven dental drilling machines. A further object of the invention is to provide a tool in which the working implement, such as a dental burr or drill or grinding wheel, is driven by a high speed motor with a suitable number of revolutions of the motor as well as of the working implement. A still further object of the invention is to provide a tool in which the rotation of the working implement is immediately discontinued or is very quickly braked when the pressure fluid supply is interrupted. A still further object of the invention is to provide a tool in which change of the working implement may be carried out in a simple way. A still further object of the invention is to provide a hand tool which is well balanced and fits well in the hand of an operator, such as a dentist.

For these and other purposes we provide a tool having a rotary motor with a housing and means for supplying pressure fluid to the motor for driving the same, a rotor mounted for rotation in said housing, a motor shaft mounted to rotate in the housing, a set of rolling bodies, an outer race with large diameter and an inner race with smaller diameter, with which races said set of rolling bodies is in contact and on which the rolling bodies may roll, means for transmitting rotary motion from the rotor to one of said races, means for transmitting rotary motion to said motor shaft from said set of rolling bodies, a hand-piece provided with means for fitting a rotary working implement and for driving said implement from said motor shaft, and means for controlling the flow of fluid for driving the rotor. Further characteristic features of the invention are set forth in the following description of one embodiment of the invention and in the claims.

In the accompanying drawing one embodiment of a tool according to the invention for dental purposes is illustrated by way of example. Fig. 1 is a longitudinal cross section of the tool and Fig. 2 is a section on line II—II of Fig. 1.

The dental tool illustrated in the drawing is provided with a motor housing comprising a front section 1 and a rear section 2 which is screw threaded in the front section at 3. The front section 1 forms a socket 4 accommodating a hose connection 5 through which compressed air is supplied to the tool from a suitable source. A compressed air driven rotor 6 is rotatably mounted in the motor housing and consists of a turbine wheel which is supplied with driving air from an annular admission chamber 7 in the front section 1 through nozzles 8 in a partition 9. Instead of a turbine a sliding vane motor or any other rotary air motor may naturally be employed. The compressed air supply to the admission chamber 7 is controlled by a spring loaded ball valve 10 disposed in the socket 4. From the valve housing formed by the hose connection 5 and the socket 4 a passage 11 leads to the annular admission chamber 7. The air flowing from the turbine wheel 6 flows into an annular chamber 12 and from there to the atmosphere through openings 13 is directed rearwardly and arranged in the rear section 2 of the housing. The turbine wheel 6 has axially extended hub portions 14 fitted in ball bearings one at each side of the turbine wheel. These ball bearings consist of inner races 15, outer races 16, sets of balls 17 and ball retainers 18. The outer race 16 of the rear ball bearing is press fitted in the rear section 2 of the motor housing, whereas the forward ball bearing has an outer race 16 axially movable in the partition 9 and kept from turning by an annular disc 19 of rubber or other suitable flexible material. A motor shaft 20 extends freely through a central bore in the turbine wheel 6 and the axial extensions 14 and is mounted for rotation in two ball bearings 21 and 22. The ball bearing 21 is fitted in the rear section 2 of the motor housing, whereas the ball bearing 22 is fitted in a sleeve 23 in the front section 1 which sleeve is axially movable relative to the ball bearing 22. The ball retainers 18 form means for transmitting rotary motion of the balls 17 around the turbine axis to the shaft 20. For this purpose the ball retainers 18 are connected to the shaft 20 by means of pins 24 extending transversely through the ball retainers and the shaft. In view of the fact that the balls 17 rotate around the turbine axis which is the longitudinal axis of the tool with a number of revolutions which is less than half the number of revolutions of the turbine wheel 6 the balls function substantially as the planetary wheels of a planetary friction gear the number of revolutions of the shaft 20 being less than half the number of revolutions of the turbine wheel 6. The ability of the ball retainers 18 to transmit a torque to the shaft 20 naturally depends on the frictional contact between the balls 17 and the inner races 15 and outer races 16. In order to maintain such frictional contact the axially movable outer race 16 of the forward bearing is loaded or biased by a spring 25 in the direction towards the turbine wheel. The spring 25 transmits axial pressure to the outer race 16 and is fitted between said race and the sleeve 23 which is also axially movable in the motor housing section 1. A rod 26 is slidable lengthwise of the socket 4 and engages an inclined recess or slot 27 in the sleeve 23 and also serves to prevent the sleeve 23 from turning in the front section 1 around the longitudinal axis of the tool. Displacement of the sleeve 23 in the direction towards the rear section 2 of the motor housing causes displacement of the rod 26 due to the shape of the inclined bottom of the recess 27 on which the rod 26 rests. Said displacement lifts the valve 10 from its seat and opens the air supply to the turbine.

A hand-piece is detachably inserted in the front section 1 of the motor housing and in the illustrated embodiment said hand-piece consists of a substantially tubular housing 30 which fits into a bore in the motor housing section 1 and is retained in inserted position by a flat circular spring loaded ball lock 28. The housing 30 contains an intermediate shaft 31 which is mounted in a ball bearing 32 and a needle bearing 33. The intermediate shaft is provided with a claw coupling member 34 which is engageable with a claw coupling member 35 fixed on the shaft 20. The coupling member 35 carries a brake cone 36 which cooperates with a corresponding brake cone 37 in the sleeve 23. A spring 38 keeps the intermediate shaft 31 in the position illustrated in the figures.

A flat spring 39 which forms a soft bend is fitted in the housing 30 between an abutment 40 on the housing and an abutment 41 on the sleeve 23. When the high portion of the flat spring 39 is pressed towards the housing 30 the rear end of the spring 39 which is guided in the housing 30 moves the sleeve 23 towards the turbine causing the rod 26 to open the valve 10 and simultaneously the brake cone 37 to disengage the brake cone 36 so that the turbine may rotate and drive the motor shaft 20 and the intermeditate shaft 31. An increased pressure on the flat spring 39 produces an increased displacement of the sleeve 23 and increased tension of the spring 25 which increases the frictional contact between the balls 17 and the races 15 and 16 so that an increased turbine torque may be transmitted through the friction transmission.

The intermediate shaft 31 is provided with a chuck 45 screw threaded into the intermediate shaft. In the chuck a cylindrical shank of a not illustrated working implement such as a dentist's burr, a grinding wheel, a polishing wheel or other working implement may be inserted. The chuck 45 has an internal tapering portion at the rear end which tapering portion cooperates with an external tapering portion 44 of an axially slotted spanner sleeve 43 which is fitted in the bore 29 in the intermediate shaft 31 and serves to retain the working implement. In order to fix the working implement in the chuck the shaft 20 is provided with a knob 46 at the rear end which extends from the rear section 2 by means of which the shaft 20 and the intermediate shaft 31 may be turned manually relative to the hand-piece 30. Furthermore, the hand-piece 30 with the bearing 32 is displaceable on the intermediate shaft 31 towards the motor housing 1, 2 and against the action of the spring 38. Through movement of the hand-piece 30 towards the motor housing from the illustrated position, in which the ball lock 28 engages an annular groove 47 in the hand-piece 30, claws 48 formed on the chuck 45 engage and retained by recesses 42 in the inner front end of the hand-piece 30. In this position turning of the intermediate shaft 31 by means of the knob 46 causes the chuck 45 to be threaded in or out of the intermediate shaft 31 and when the chuck 45 is threaded into the shaft 31 the slotted spanner sleeve 43 is tightened since the internal taper of the chuck 45 encloses the corresponding external taper 44 of the spanner sleeve 43 and tightens said sleeve around the shank of a tool (not illustrated) which is inserted in the chuck and the spanner sleeve. Loosening of the working tool implement is produced by turning the knob in the opposite direction.

The dental tool above described and illustrated in the drawing should be considered only as an example and the details of the invention may be modified in several different ways within the scope of the claims. Instead of the ball valve 10 controlling the pressure fluid supply to the rotor a valve mechanism may be provided which controls the exhaust ports of the turbine or other motor. The illustrated straight hand-piece may naturally be replaced by an angle type handpiece as is conventional in connection with dental tools. The tool may also be used for other than dental purposes for instance as a grinding or milling machine for intricate jobs such as manufacture of pressing or forging tools, artist's sculptural jobs, or the like.

What we claim is:

1. A tool having a rotary motor with a housing and means for supplying pressure fluid to said motor for driving the same, a rotor in said housing having hub portions extending axially one at each end of said rotor, a motor shaft mounted to rotate in the housing and extending through the rotor coaxially therewith, a first set of rolling bodies, a first outer race with large diameter fixed in the housing and a first inner race with smaller diameter fixed on one of said hub portions, said first set of rolling bodies being in contact with said races on which the rolling bodies roll, means for transmitting rotary motion to said motor shaft from said first set of rolling bodies, a second set of rolling bodies, a second outer race with large diameter and a second inner race with smaller diameter forming a mounting for said other hub portion, said second set of rolling bodies being in frictional contact with said second races on which said second set of rolling bodies roll, a hand-piece provided with means for fitting a rotary working implement and for driving said implement from said motor shaft, and means for controlling the flow of fluid for driving the rotor.

2. A tool according to claim 1, in which means are provided for transmitting rotary motion to said motor shaft from said second set of rolling bodies, and means for holding said second outer race against rotation.

3. A tool having a rotary motor with a housing and means for supplying pressure fluid to the motor for driving the same, a rotor mounted for rotation in said housing, a motor shaft mounted to rotate in the housing and extending through said rotor and free to rotate relative to the rotor and relative to the housing, means for transmitting rotary motion from said rotor to said motor shaft, a hand-piece provided with means for fitting a rotary working implement, an intermediate shaft mounted to rotate in said hand-piece, and a claw coupling between said motor shaft and said intermediate shaft disengageable upon axial displacement of the intermediate shaft in the direction away from the motor shaft.

4. A tool according to claim 3, in which a chuck is provided in said hand-piece for receiving a shank of a working implement, a portion of the motor shaft extending through the rear end of the housing and carrying a knob outside the housing, said knob serving to manually rotate the motor shaft and the intermediate shaft in order to operate said chuck to engage or to release said shank, respectively.

5. A tool having a rotary motor with a housing and means for supplying pressure fluid to the motor for driving the same, a rotor mounted for rotation in said housing, a motor shaft mounted to rotate in the housing and extending through said rotor and free to rotate relative to the rotor and relative to the housing, means for transmitting rotary motion from said rotor to said motor shaft, a hand-piece provided with means for fitting a rotary working implement and with an intermediate shaft mounted to rotate in said hand-piece for driving said implement, a coupling between said motor shaft and said intermediate shaft disengageable upon axial displacement of the intermediate shaft away from the motor shaft, means for braking the rotation of said motor shaft, and means between the working implement receiving end of the hand-piece and the rotor for operating said braking means to engage or disengage the braking means, respectively.

6. A tool having a rotary motor with a housing and means for supplying pressure fluid to the motor for driving the same, a rotor mounted for rotation in said housing, a motor shaft mounted to rotate in the housing and extending through said rotor and free to rotate relative to the rotor and relative to the housing, means for transmitting rotary motion from said rotor to said motor shaft, a hand-piece provided with means for fitting a rotary working implement and with an intermediate shaft mounted to rotate in said hand piece for driving said implement, a coupling between said motor shaft and said intermediate shaft disengageable upon axial displacement of the intermediate shaft in a direction away from the motor shaft, means for braking the rotation of the motor shaft, means for regulating the flow of fluid for driving the rotor, and means between the working implement receiving end of the hand-piece and the rotor for operating said braking means and said regulating means simultaneously to release the braking means and to increase the flow of fluid or to engage the braking means and to decrease the flow of fluid, respectively.

7. A tool having a rotary motor with a housing and means for supplying pressure fluid to said motor for driving the same, a rotor in said housing having hub portions extending axially one at each end of said rotor, a motor shaft mounted to rotate in the housing and extending through the rotor coaxially therewith, a first set of rolling bodies, a first outer race with large diameter fixed in the housing and a first inner race with smaller diameter fixed on one of said hub portions, said first set of rolling bodies being in contact with said races on which the rolling bodies roll, means for transmitting rotary motion to said motor shaft from said first set of rolling bodies, a second set of rolling bodies, a second outer race with large diameter axially movable but held against rotation in the housing, a second inner race with smaller diameter forming a mounting for said other hub portion, said second set of rolling bodies being in frictional contact with said second races on which said second set of rolling bodies may roll, a hand-piece provided with means for fitting a rotary working implement and for driving said implement from said motor shaft, means for braking the rotation of the motor shaft, means for regulating the flow of fluid for driving the rotor, spring means actuating said second outer race to produce frictional contact between said sets of rolling bodies and said pertaining inner and outer races, and means between the working implement receiving end of said hand-piece and the rotor for controlling said braking means, said flow regulating means and the tension of said spring means to reduce braking action and increase frictional contact pressure when fluid flow is increased, and vice versa.

8. A tool having a rotary motor with a housing and means for supplying pressure fluid to the motor for driving the same, a rotor mounted for rotation in said housing, a hand-piece provided with means for fitting a rotary working implement and for driving said implement from said rotor, means for regulating the flow of fluid for driving the rotor, a flat spring extending in curved shape along said hand-piece and resting with one end on a fixed abutment on the hand-piece and guided with the opposite end in the hand-piece and actuating said flow regulating means.

9. A tool according to claim 8, in which a sleeve member is fitted to slide axially on said hand-piece over said flat spring to retain said spring in various depressed positions to retain the regulating means in various positions.

10. A tool having a rotary pressure fluid driven motor with a housing and a rotor mounted for rotation in said housing, valve means in said tool for controlling the flow of fluid for driving the rotor, a motor shaft mounted to rotate in the housing and rotatable relative to the rotor, bearings in the housing in which the rotor is mounted and which are provided one at each end of the rotor and comprise sets of rolling bodies running on races, at least one of said sets of rolling bodies being provided with and cooperating with means for transmitting the rotary motion of said set around the motor axis to the motor shaft, and each one of said sets being arranged to roll on a race arranged for rotation with the rotor and a second race provided in the housing, at least said second race pertaining to the set of rolling bodies which transmits rotation to the motor shaft being held against rotation in the housing, and means for producing axial pressure on said bearings to ascertain frictional engagement between the rolling bodies and the races.

References Cited in the file of this patent

UNITED STATES PATENTS

| | | |
|---|---|---|
| 1,256,175 | Shelton | Feb. 12, 1918 |
| 2,251,057 | Iseman | July 29, 1941 |